US008051650B2

(12) United States Patent
Vetter et al.

(10) Patent No.: US 8,051,650 B2
(45) Date of Patent: Nov. 8, 2011

(54) HYDRAULIC SYSTEM

(75) Inventors: Christoph Vetter, Ötigheim (DE); Eric Müller, Kaiserslautern (DE); Reinhard Stehr, Bühl (DE); Hanjo Nissen, Bühl (DE); Volker Edelmann, Bühl-Baden (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 787 days.

(21) Appl. No.: 12/072,137

(22) Filed: Feb. 21, 2008

(65) Prior Publication Data

US 2008/0209902 A1 Sep. 4, 2008

Related U.S. Application Data

(60) Provisional application No. 61/005,479, filed on Dec. 5, 2007, provisional application No. 60/937,430, filed on Jun. 27, 2007, provisional application No. 60/937,276, filed on Jun. 26, 2007, provisional application No. 60/937,275, filed on Jun. 26, 2007, provisional application No. 60/902,562, filed on Feb. 21, 2007, provisional application No. 60/902,561, filed on Feb. 21, 2007.

(51) Int. Cl.
*F16D 31/02* (2006.01)

(52) U.S. Cl. ........................................... 60/420; 60/426

(58) Field of Classification Search .................... 60/420, 60/422, 426
See application file for complete search history.

(56) References Cited

U.S. PATENT DOCUMENTS

| | | | | |
|---|---|---|---|---|
| 4,819,430 | A * | 4/1989 | Becker | 60/422 |
| 5,201,687 | A | 4/1993 | Friedmann | 474/18 |
| 5,642,616 | A * | 7/1997 | Park | 60/426 |
| 6,336,880 | B1 | 1/2002 | Agner | 474/28 |
| 6,431,012 | B1 | 8/2002 | Agner | 73/862.08 |
| 2009/0007556 | A1* | 1/2009 | Djurovic et al. | 60/420 |
| 2010/0192562 | A1* | 8/2010 | Heemskerk et al. | 60/420 |

FOREIGN PATENT DOCUMENTS

| | | | |
|---|---|---|---|
| DE | 40 36 683 | A1 | 5/1991 |
| DE | 199 09 348 | A1 | 9/1999 |
| DE | 100 21 793 | A1 | 11/2000 |
| GB | 2 024 343 | A | 1/1980 |

* cited by examiner

*Primary Examiner* — Michael Leslie
(74) *Attorney, Agent, or Firm* — Alfred J. Mangels

(57) ABSTRACT

A hydraulic system for actuating a clutch and/or a variable speed drive unit of a belt-driven conical-pulley transmission of a vehicle, such as a commercial vehicle, and having a variable transmission ratio and a torque sensor. The hydraulic system includes at least one hydraulic energy source. A selector and check valve is provided for supplying additional components besides the torque sensor and is connected between the hydraulic energy source, the additional components, and the torque sensor in such a way that the torque sensor includes priority in being supplied with hydraulic medium.

7 Claims, 1 Drawing Sheet

HYDRAULIC SYSTEM

BACKGROUND OF THE INVENTION

The present invention relates to a hydraulic system for actuating a clutch and/or a variable speed drive unit of a belt-driven conical-pulley transmission of a vehicle with a variable transmission ratio, in particular a commercial vehicle, and having at least one hydraulic energy source. In a preferred exemplary embodiment, the hydraulic system includes a torque sensor. However, the invention also includes exemplary embodiments without torque sensors.

An object of the invention is to provide a hydraulic system which enables greater efficiency or reduction in the size of the hydraulic energy source. In particular, the supplying of various components is to be improved.

SUMMARY OF THE INVENTION

The object is achieved in the case of a hydraulic system for actuating a clutch and/or a variable speed drive unit of the belt-driven conical-pulley transmission with a variable adjustable transmission ratio, of a vehicle, in particular a commercial vehicle, having at least one hydraulic energy source and having a preferred torque sensor, by having a selector valve and check valve device for supplying additional components besides the torque sensor, connected between the hydraulic energy source, the additional components and the torque sensor in such a way that the torque sensor includes priority in being supplied with hydraulic medium. That improves the reliability of operation of a motor vehicle equipped with the hydraulic system. The selector and check valve is preferably designed as a slide valve.

A preferred exemplary embodiment of the hydraulic system is characterized in that the selector and check valve device for supplying the additional components is connected between the hydraulic energy source and the additional components. The selector and check valve is preferably designed as a 3/3 directional valve.

Another preferred exemplary embodiment of the hydraulic system is characterized in that the selector and check valve device for supplying the additional components is pre-tensioned in a closed state. In the closed state, all connections of the selector and check valve device are closed. The pre-tensioning in the closed state is made possible for example by a spring.

Another preferred exemplary embodiment of the hydraulic system is characterized in that the selector and check valve device for supplying the additional components works together with an orifice plate or a pressure limiting valve in a return line of the torque sensor. The orifice plate or the pressure limiting valve is downstream from the torque sensor. A control line that comes from the selector and check valve device leads into the return line of the torque sensor ahead of the orifice plate or pressure limiting valve.

Another preferred exemplary embodiment of the hydraulic system is characterized in that the selector and check valve device for supplying the additional components is connected to the return line of the torque sensor in such a way that the selector and check valve device for supplying the additional components does not open until a minimum stream of hydraulic medium is present in the return line of the torque sensor. The orifice plate or pressure limiting valve in the return line provides for a minimum flow volume through the torque sensor. That maintains a constant supplying of or pressure on the torque sensor.

Another preferred exemplary embodiment of the hydraulic system is characterized in that the selector and check valve device for supplying the additional components includes an open position in which the additional components are connected to the hydraulic energy source. The additional components may be for example transmission ratio valve devices, whose function is to provide shift pressures in shift chambers of the variable speed drive unit.

Another preferred exemplary embodiment of the hydraulic system is characterized in that the selector and check valve device for supplying the additional components includes an additional open position in which the additional components are connected to the hydraulic energy source, and in which an output of the hydraulic energy source is connected through the open selector and check valve device to an input of the hydraulic energy source. That provides the benefit that surplus hydraulic medium is fed back to the hydraulic energy source, preferably a high pressure pump.

The object stated above is also achieved in the case of a hydraulic system for actuating a clutch and/or a variable speed drive unit of the belt-driven conical-pulley transmission with a variably adjustable transmission ratio, of a vehicle, in particular a commercial vehicle, having at least one hydraulic energy source, by the fact that an output of a first transmission ratio valve device, whose function is to provide a shift pressure in a first shift chamber, and an output of a second transmission ratio device, whose function is to provide a shift pressure in a second shift chamber, are connected directly to an (or the) input of the hydraulic energy source. In driving states where there is little need for hydraulic medium under high pressure, the hydraulic medium stream is again guided directly ahead of the input or inlet of the hydraulic energy source, in particular a high pressure pump. Only minimal back pressures arise. A low pressure pump used to supply the high pressure pump can be reduced in size due to the returned hydraulic medium.

The object stated above is also achieved in the case of a hydraulic system by the fact that the hydraulic energy source includes at least one high pressure pump and at least one low pressure pump, which are connected to each other. The low pressure pump supplies the high pressure pump with hydraulic medium, which is under low pressure and is raised to a high pressure in the high pressure pump.

Another preferred exemplary embodiment of the hydraulic system is characterized in that the outputs of the transmission ratio valve devices are connected directly to an input of the high pressure pump. That provides the benefit that during the shift of the variable speed drive unit, hydraulic medium from the drained shift chamber can be partially routed to a low pressure region or low pressure circuit between the high pressure pump and the low pressure pump. This makes it possible to reduce the delivery volumes of the low pressure pump.

Another preferred exemplary embodiment of the hydraulic system is characterized in that the hydraulic energy source includes a first and a second low pressure pump. Preferably, the two low pressure pumps are connected in parallel.

Another preferred exemplary embodiment of the hydraulic system is characterized in that an output of the second low pressure pump is connectable through a pressure regulating valve device to an input of the high pressure pump, which is connected to an output of the first low pressure pump. The pressure regulating valve device serves to set the pressure level for the second low pressure pump.

Another preferred exemplary embodiment of the hydraulic system is characterized in that the pressure regulating valve device includes a selector position in which the output of the second low pressure pump is connected to a tank. That provides the benefit that the stream transported by the second low pressure pump can be diverted directly into the tank, depending on need. That makes it possible to reach a minimum backup/working pressure. Furthermore, the losses of the second low pressure pump can be minimized.

Another preferred exemplary embodiment of the hydraulic system is characterized in that the pressure regulating valve device includes another selector position in which the stream transported by the second low pressure pump is merged with the stream transported by the first low pressure pump. The merged streams transported by the two low pressure pumps are fed to the low pressure region or low pressure circuit.

Another preferred exemplary embodiment of the hydraulic system is characterized in that the outputs of the low pressure pumps, individually or together, are connected through the pressure regulating valve device to additional components, in particular cooling devices. The cooling devices include for example a clutch cooler and a variable speed drive unit cooler.

Another preferred exemplary embodiment of the hydraulic system is characterized in that in the low pressure region or low pressure circuit a control switching valve device for supplying the additional components is connected between the pressure regulating valve device and the additional components in such a way that a variable speed drive unit cooling device includes priority in being supplied with cooling medium. The variable speed drive unit cooling device includes higher priority than the other components in being supplied with hydraulic medium under low pressure.

Another preferred exemplary embodiment of the hydraulic system is characterized in that the control switching valve device is downstream from an orifice plate, whose backpressure works together with the control switching valve device in such a way that the additional components are supplied with hydraulic medium along with the variable speed drive unit cooling device only after a minimum back pressure includes been exceeded. Only when sufficient hydraulic medium is flowing through the variable speed drive unit cooling device are the additional components also brought online.

Another preferred exemplary embodiment of the hydraulic system is characterized in that downstream from the control switching valve device is an orifice plate switching device with various orifice plates, whose backpressures work together with the control switching valve device in each case in such a way that the additional components are supplied with hydraulic medium along with the variable speed drive unit cooling device only after a minimum back pressure includes been exceeded. The orifice plate switching device is preferably designed as a 2/2 directional valve.

Another preferred exemplary embodiment of the hydraulic system is characterized in that the pressure regulating valve device includes an additional selector position in which the output of the second low pressure pump is connected to a medium pressure region or medium pressure circuit. The medium pressure is for example 20 bar, and is greater than the low pressure, which is for example 3 bar, and less than the high pressure. If the medium pressure is exceeded, then the surplus hydraulic medium is either led off to the low pressure region or low pressure circuit or into the tank.

Another preferred exemplary embodiment of the hydraulic system is characterized in that the medium pressure region or medium pressure circuit includes additional components, which are supplied with hydraulic medium at the medium pressure through additional valve devices, depending on need. The additional components are for example a clutch-like braking device for the power train of the motor vehicle or the controller of a switch actuating system.

Another preferred exemplary embodiment of the hydraulic system is characterized in that a pressure filter is connected between the second low pressure pump and the pressure regulating valve device. The pressure filter includes a filter, with a check valve or pressure limiting valve connected parallel to it.

Another preferred exemplary embodiment of the hydraulic system is characterized in that a pressure filter connected to the second low pressure pump is connected downstream from the pressure regulating valve device. That provides the benefit that the stream of hydraulic medium conducted into the tank at the pressure regulating valve device does not have to be passed through the pressure filter.

Another preferred exemplary embodiment of the hydraulic system is characterized in that the hydraulic energy source includes a first and a second high pressure pump, which is connected parallel to the first high pressure pump. The two high pressure pumps make it possible to supply different hydraulic medium streams according to need.

Another preferred exemplary embodiment of the hydraulic system is characterized in that a limiting valve is connected parallel to the second high pressure pump in such a way that the stream transported by the second high pressure pump is fed according to need to an input of at least one of the high pressure pumps. That provides the benefit that only slight backpressures develop. The low pressure pump or pumps can be reduced in size due to the returned hydraulic medium.

BRIEF DESCRIPTION OF THE DRAWING

The structure, operation, and advantages of the present invention will become further apparent upon consideration of the following description taken in conjunction with the accompanying drawing, in which.

DESCRIPTION OF THE PREFERRED EMBODIMENTS

Figure 1:
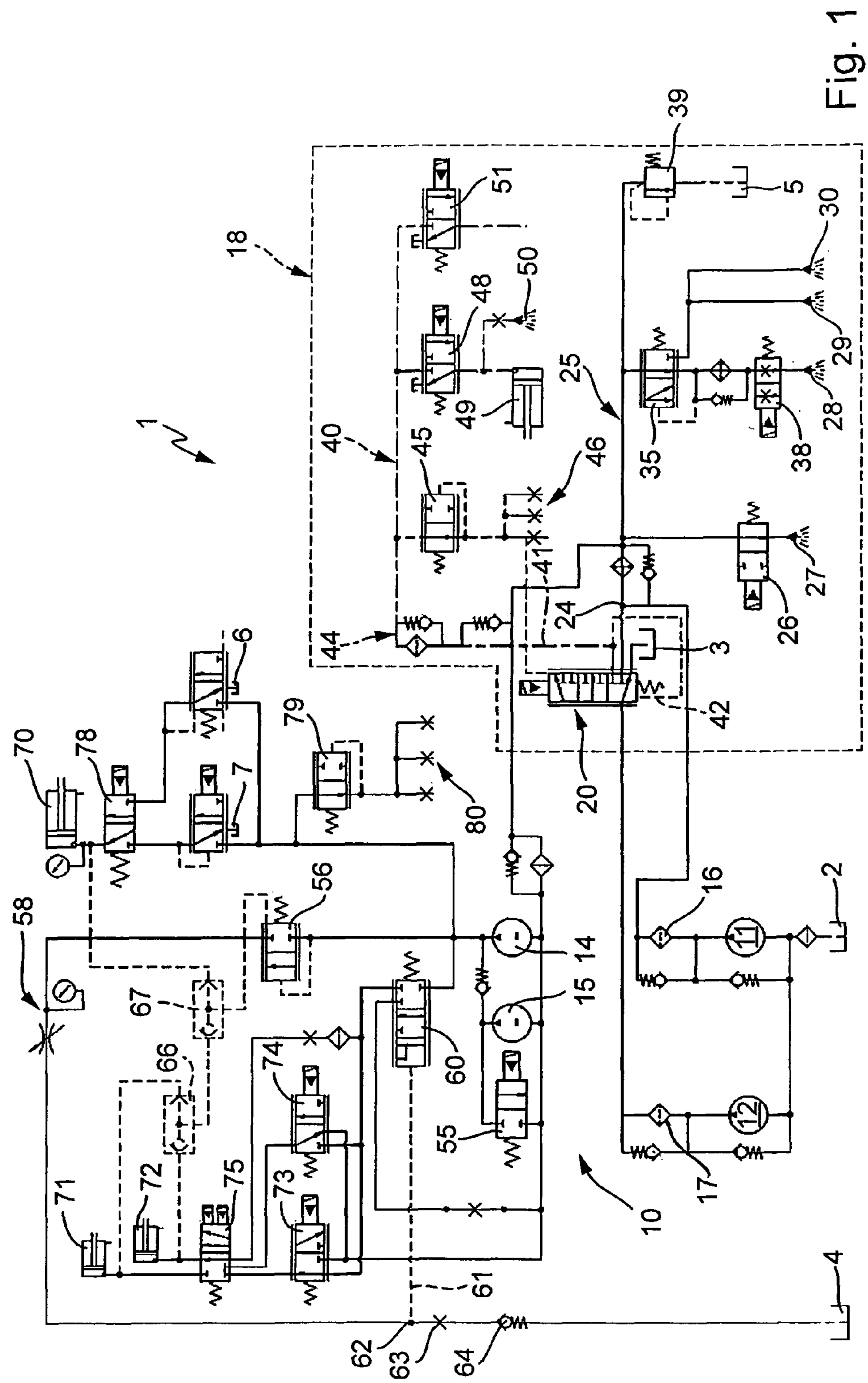
FIG. 1 shows a hydraulic system 1 in the form of a hydraulic circuit diagram, with the help of symbols conventionally used in hydraulics.

In the hydraulic circuit diagram shown in FIG. 1, hydraulic system 1 includes a tank with hydraulic medium that is designated at various places by symbols 2 through 7. The hydraulic medium contained in the tank is preferably hydraulic oil, also referred to as oil. Numerous filters, pressure limiting valves or spring-loaded check valves and coolers are shown in the hydraulic circuit diagram by means of conventional hydraulic symbols, not all of which are given reference labels, for reasons of clarity.

Hydraulic system 1 serves to control a belt-driven conical-pulley transmission, which is situated in the power train of a motor vehicle. Such belt-driven conical-pulley transmissions are also referred to as CVT transmissions (CVT, continuously variable transmission). This is a stepless vehicle transmission, which makes great driving comfort possible through smooth, jerk-free changing of the transmission ratio.

Hydraulic system 1 includes a hydraulic energy source 10 with a first low pressure pump 11 and a second low pressure pump 12. The inputs of low pressure pumps 11 and 12 are connected to the tank 2. Connected in parallel to each of the low pressure pumps 11, 12 is a spring-loaded check valve or pressure limiting valve. Low pressure pumps 11, 12 are forward-flow pumps, which supply a first high pressure pump 14 and a second high pressure pump 15 with hydraulic medium. Connected downstream from each of the low pressure pumps 11, 12 is a pressure filtering device 16, 17. Pressure filtering devices 16, 17 each include a filter and a spring-loaded check valve or pressure limiting valve.

Low pressure pumps 11, 12 are connected to high pressure pumps 14, 15 through a distribution or shift system 18. Distribution or shift system 18 includes a pressure regulating valve device 20, which is designed as a 3/3 directional valve. The output of the second low pressure pump 12 is connected to the left side of pressure regulating valve device 20 in FIG. 1. The right side of pressure regulating valve device 20 in FIG. 1 includes—viewed from bottom to top—a return connection to tank 3, a connection to a junction 24 and a connection to a connecting line 41.

At the junction 24 downstream from pressure regulating valve device 20, the output of first low pressure pump 11 is connected to a low pressure region 25, which is also referred to as a low pressure circuit. Low pressure circuit 25 contains hydraulic medium which is supplied by the first and/or second low pressure pump 11, 12. The hydraulic medium in the low pressure region 25 is under a pressure of about 3 bar, which is also referred to as low pressure. A selector valve 26 which serves to supply a clutch cooler 27 is provided in low pressure region 25. In addition to clutch cooler 27, low pressure region 25 also includes a variable speed drive unit cooler 28 and additional coolers 29, 30.

To give the variable speed drive unit cooler 28 priority over the other coolers 29, 30, a control switching valve device 35 is provided, which is pre-tensioned in the indicated selector position by a spring. In the indicated position of the control switching valve 35 in the form of a 3/3 directional valve, variable speed drive unit cooler 28 is connected to low pressure region 25 through an orifice plate switching device 38. The other coolers 29, 30 are separated from low pressure region 25 in the indicated selector position of control switching valve device 35. Orifice plate switching device 38 includes two orifice plates, which provide different flow volumes to variable speed drive unit cooler 28. The pressure in low pressure region 25 is maintained by a pressure limiting valve 39.

Distribution or shift system 18 also includes, in addition to low pressure region 25, a medium pressure region 40, which is also referred to as a medium pressure circuit. Medium pressure region 40 is connected via connecting line 41 to pressure regulating valve device 20. In the selector position of pressure regulating valve device 20 shown in FIG. 1, second low pressure pump 12 delivers to tank 3, as indicated by the arrow. At the same time, low pressure region 25 is supplied with hydraulic medium under low pressure by first low pressure pump 11.

It is indicated at 44 that the pressure filtering device connected to second low pressure pump 12 may also be situated in medium pressure region 40 instead of at 17. Situating pressure filtering device 44 downstream from or after pressure regulating device 20 provides the benefit that the stream of hydraulic medium fed into tank 3 at pressure regulating valve device 20 is not passed through pressure filtering device 44. From pressure regulating valve device 20 a return line 42 emerges, which supplies a pressure regulating valve 45 with hydraulic medium at low pressure through connecting line 41. Pressure regulating valve device 45 serves to provide a pilot pressure, which is switched according to need with the help of magnets 46 through proportional solenoid valves to the individual valve devices in the distribution or shift system 18.

Situated in the medium pressure region 40 is a selector valve 48, which is designed as a 3/2 directional valve. Selector valve 48 serves to supply a clutch-like brake 49 and an additional cooler 50 with hydraulic medium under medium pressure. An additional selector valve 51, which like selector valve 48 is designed as a spring pre-tensioned proportional solenoid valve, serves for example to supply a switch actuating system (not shown) with hydraulic medium under medium pressure.

When pressure regulating valve device 20 is in its middle position, second low pressure pump 12 is also switched on, in order for example to supply an increased demand for hydraulic medium for cooling purposes. In the third, upper selector position of pressure regulating valve device 20, a medium pressure of about 20 bar is provided by second low pressure pump 12. The hydraulic medium under medium pressure is supplied via connecting line 41 to the medium pressure components 49, 50. If the desired medium pressure of about 20 bar is exceeded, then removal of the surplus hydraulic medium into low pressure region 25 or into tank 3 is made possible through return line 42.

The part of hydraulic system 1 connected to the outputs of high pressure pumps 14, 15 is also referred to as the high pressure region, and is at a pressure that is significantly greater than the medium pressure in medium pressure region 40. A limiting valve 55 is connected parallel to second high pressure pump 15, which in turn is connected parallel to first high pressure pump 14. Limiting valve 55 is designed as a 2/2 directional valve, and serves to send the stream of hydraulic medium supplied by second high pressure pump 15 directly before the inlet or input of high pressure pumps 14, 15.

Connected downstream from high pressure pumps 14, 15 is a pressure regulating valve 56, which serves to maintain a desired system pressure. Connected downstream from pressure regulating valve device 56 is a torque sensor 58, which is connected to tank 4 through a return line 62, in which an orifice plate 63 or a pressure limiting valve 64 is situated. Return line 62 is connected through a control line 61 to a selector and check valve device 60 that is designed as a 3/3 directional valve, which is pre-tensioned in the shown closed position by a spring. The shown position is the normal position of the selector and check valve device 60, also referred to as the closed position. In the shown closed position, the supplying of additional components besides the torque sensor 58 is interrupted. That gives priority to torque sensor 58.

Pressure regulating valve 56 is connected to a clutch 70 and to shift chambers 71, 72 of the variable speed drive unit through control lines that contain OR connections 66, 67. Clutch 70 is supplied with hydraulic medium through additional valve devices. Shift chambers 71, 72 are supplied selectively with hydraulic medium through transmission ratio valve devices 73, 74 and an emergency switching valve device. However, shift chambers 71, 72 are not supplied with hydraulic medium through selector and check valve device 60 until a minimum hydraulic flow is reached in the return line 62 of torque sensor 58, i.e. until an adequate supply of hydraulic medium for torque sensor 58 is ensured.

Only then is the stream of hydraulic medium provided by high pressure pumps 14, 15 supplied via selector and check valve device 60 to transmission ratio valve devices 73, 74. In the middle position of selector and check valve device 60, the stream of hydraulic medium is supplied to transmission ratio valve devices 73, 74. In the left selector position of selector and check valve device 60 in FIG. 1, the supplied stream of hydraulic medium is also fed to the input of high pressure pumps 14, 15, in addition to transmission ratio valve devices 73, 74.

Inserted between transmission ratio valve devices 73, 74 and shift chambers 71, 72 is an emergency switching valve device 75, which switches to an emergency mode in the event of a failure of the upstream valve devices. An emergency switching valve device 78 of the same design is connected ahead of clutch 70. Emergency switching valve devices 75, 78 enable emergency operation of the connected components depending on flow volume or speed of rotation.

Furthermore, situated in the high pressure region is a pressure regulating valve 79 which, analogous to the pressure regulating valve 45 in the medium pressure region 50, serves to maintain a desired system pressure in the high pressure region to supply magnets 80.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for actuating a clutch and/or a variable speed drive unit of a belt-driven conical-pulley transmission having a variably adjustable transmission ratio, of a vehicle, in particular a commercial vehicle, having at least one hydraulic energy source and having a torque sensor, wherein a selector and check valve device for supplying additional components besides the torque sensor is connected between the hydraulic energy source, the additional components, and the torque sensor in such a way that the torque sensor includes priority in being supplied with hydraulic medium, wherein the selector and check valve is a 3/3 directional valve and is positioned downstream of the at least one hydraulic energy device for selectively supplying pressurized hydraulic fluid in a first position only to the torque sensor, in a second position to a pair of transmission ratio valves and to the torque sensor, and in a third position to the pair of transmission ratio valves, to the torque sensor, and to an input to the at least one hydraulic energy source.

2. A hydraulic system in accordance with claim 1, wherein the selector and check valve for supplying the additional components is connected between the hydraulic energy source and the additional components.

3. A hydraulic system in accordance with claim 2, wherein the selector and check valve for supplying the additional components is pre-tensioned in a closed state.

4. A hydraulic system in accordance with claim 1, wherein the selector and check valve for supplying the additional components works together with an orifice plate or a pressure limiting valve in a return line of the torque sensor.

5. A hydraulic system in accordance with claim 1, wherein the selector and check valve for supplying the additional components includes an open position in which the additional components are connected to the hydraulic energy source.

6. A hydraulic system for actuating a clutch and/or a variable speed drive unit of a belt-driven conical-pulley transmission having a variably adjustable transmission ratio, of a vehicle, in particular a commercial vehicle, having at least one hydraulic energy source and having a torque sensor, wherein a selector and check valve for supplying additional components besides the torque sensor is connected between the hydraulic energy source, the additional components and the torque sensor in such a way that the torque sensor includes priority in being supplied with hydraulic medium, wherein the selector and check valve for supplying the additional components works together with an orifice plate or a pressure limiting valve in a return line of the torque sensor, and wherein the selector and check valve for supplying the additional components is connected to the return line of the torque sensor in such a way that the selector and check valve for supplying the additional components does not open until a minimum stream of hydraulic medium is present in the return line of the torque sensor.

7. A hydraulic system for actuating a clutch and/or a variable speed drive unit of a belt-driven conical-pulley transmission having a variably adjustable transmission ratio, of a vehicle, in particular a commercial vehicle, having at least one hydraulic energy source and having a torque sensor, wherein a selector and check valve for supplying additional components besides the torque sensor is connected between the hydraulic energy source, the additional components and the torque sensor in such a way that the torque sensor includes priority in being supplied with hydraulic medium, wherein the selector and check valve for supplying the additional components includes an open position in which the additional components are connected to the hydraulic energy source and wherein the selector and check valve for supplying the additional components includes an additional open position in which the additional components are connected to the hydraulic energy source, and in which an output of the hydraulic energy source is connected through the open selector and check valve to an input of the hydraulic energy source.

* * * * *